March 12, 1940.  J. MUNRO  2,193,373

DISTRIBUTOR

Filed July 2, 1936  2 Sheets-Sheet 1

Inventor,
James Munro
By E. F. Wendiroth
Atty

March 12, 1940.  J. MUNRO  2,193,373
DISTRIBUTOR
Filed July 2, 1936  2 Sheets-Sheet 2

INVENTOR
JAMES MUNRO
BY
ATTORNEY

Patented Mar. 12, 1940

2,193,373

UNITED STATES PATENT OFFICE 2,193,373

DISTRIBUTOR

James Munro, Lochiel, Southland, New Zealand, assignor to Hector Norman McLeod, Invercargill, New Zealand Application July 2, 1936, Serial No. 88,657
In New Zealand July 10, 1935

6 Claims. (Cl. 275—2)

The present invention relates to manure and/or seed distributors of the type wherein the manure and/or seed is distributed from a container or distributor box suitably mounted as for instance rearwardly of a tractor or haulage vehicle, suitably actuated mechanism operating to distribute the manure and/or seed from the container to the ground.

According to the present invention, improved means are provided for ensuring even and steady distribution of the manure and/or seed to the ground while a further feature of the invention is the provision of means whereby the seed and manure may be mixed together in such proportions as may be from time to time desired prior to being distributed from the container to the ground.

The present invention contemplates improvements in manure and/or seed distributors of the type described, the provision of a hopper through which the manure and/ seed is fed by suitable mechanism to a chamber longitudinally divided into two compartments and an endless chain provided with distributing plates causes the material to fall into a lower compartment comprising a metal tray in which rotates a worm to force the material over the edge of the tray whence it falls to the ground.

Preferably the invention also contemplates providing the aforesaid hopper with two compartments, one for the seed and one for the manure; adjustable gates are provided from the compartments so that the rate of material therefrom may be varied as required. Worms below the exit from the compartments operate to intimately mix the seed and manure together before the mixture falls to be handled by the travelling endless chain and distributing plates as above described.

Other features will be hereinafter described and more particularly pointed out in the claims.

That the invention may be better understood one constructional embodiment is shown in the appended drawings in which, Figure 1 shows an end view of the invention attached to a motor truck.

Figure 5:
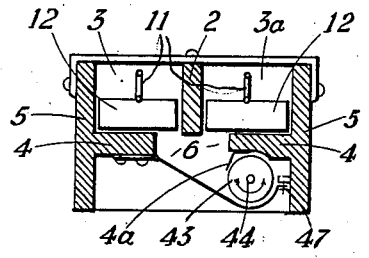
Figure 5 is a cross-section through the conveyor box.
Figure 6:
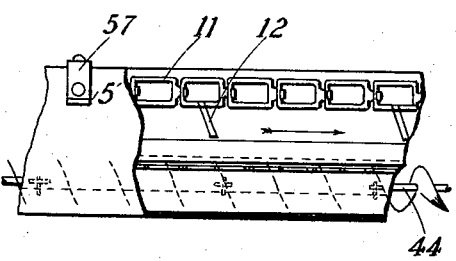
Figure 6 is a side view of part of the conveyor box partly opened to show the inside parts.
Figure 7:
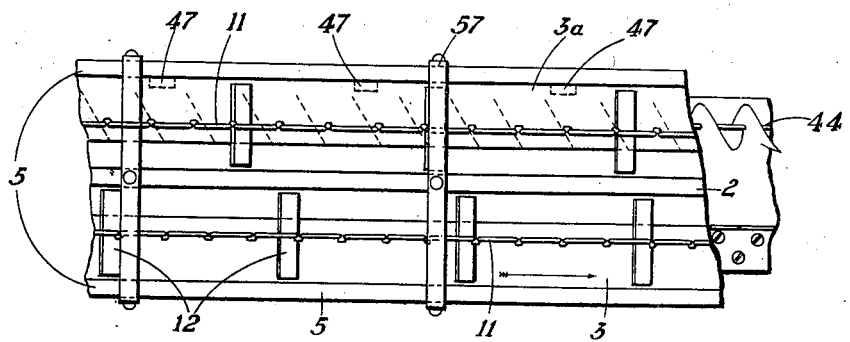
Figure 7 is a plan view of the part of the conveyor box.

In construction, the appliance comprises what may be termed a conveyor box 1, which in one form may be 10 feet long 8½ inches wide and 5 or 6 inches deep such dimensions being, however, variable to suit local and individual requirements. A cross section of the box 1 is shown in Figure 5, from which it will be noted that said box comprises an upper and a lower portion, the upper portion being divided by a lengthwise midboard 2 into compartments 3 and 3a, the latter being nearer the hauling vehicle or tractor. Horizontal partitions 4 project inwardly from the front and back sides 5 of the conveyor box 1. The said partitions 4 do not meet at their inner edges but are so disposed as to provide a space 6, wider than the mid-board 2. This construction permits material in either of the compartments 3 or 3a to pass downwards through the space 6.

Any suitable means may be used to suspend the conveyor box on the back of the hauling vehicle or tractor. One method is shown in which brackets 7 attached to the floor of the vehicle 8 hang downwards and project rearwards, being bent outwards horizontally to provide rounded ends 9 engaging with holes in the upper ends of iron links 10 bolted on both sides of the conveyor box 1.

Figure 2:
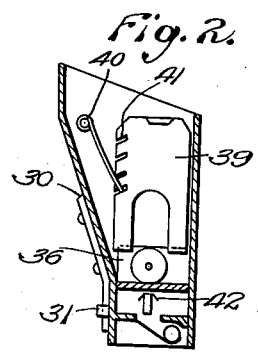
Figure 2 is a sectional view through the mixing hopper.

Along each compartment 3 and 3a moves a conveyor chain 11 comprising links set on edge and having welded or otherwise secured to the lower sides of occasional links distributing plates 12, which have their lower ends inclined forward in the direction of movement and bearing lightly upon the partition boards 4. The conveyor chain 11 is mounted and rotates upon sprocket wheels 13 at each end of the conveyor box 1. Motion is given to one of the sprocket wheels 13 by driving means to be hereinafter described. At the other end remote from the driving means a spring tension device is provided to compensate for slackness in the chains and in its preferred form comprises an eye bolt 14 with the eye passing over the vertical spindle 15 carrying the chain sprocket 13. A compression spring 16 on the outer end of the bolt 14 bears against a plate 17 on the extreme end of the conveyor box so that variations in the length of the chain cause compensating changes in the tension spring 16. Above the conveyor box and approximately over the mid-board 2 is a conveyor shaft 18 driven by the movement of the haulage vehicle in a suitable manner as for instance is hereinafter described. Conveniently disposed on the shaft 18 is a chain sprocket 19 to receive the driving chain 20 from the vehicle wheel. The shaft 18 extends to one end of the conveyor box and gives rotary motion to a bevel pinion 21 slidably mounted on the conveyor shaft 18. In its present form, the shaft where carrying the bevel pinion 21 is square shaped. Gearing with and underneath the bevel pinion 21 is a toothed disc wheel 22 having its teeth so arranged as to mesh with the pinion 21 in any position on its face. Holes are made at intervals through the face of the disc wheel 22 to permit material which may inadvertently be thrown on the surface of the wheel to pass through the holes into the box below and so prevent material collecting to clog the gear teeth. From the wheel 22 a vertical spindle passes downwards and gives rotary motion to the conveyor chain sprocket 13 to provide the driving means. The combination of bevel wheel and toothed disc, with choice of a meshing position for the bevel wheel, and provision to free the wheel when changing mesh by means of a slackening of the vertical spindle in the wheel, are all known features in the manufacture of agricultural implements. The motion shaft 18 terminates in a bearing 23 approximately over the centre of the gear wheel 22. From the bearing 23 a reverse motion shaft 24 extends over the end of the conveyor box. On this shaft 24 mounts a reverse bevel pinion 25 in a similar manner to pinion 21 on shaft 18, and takes its rotary motion from the gear wheel 22 and will have a reverse direction of rotation to wheel 21. On its outer end, the reverse shaft 24 mounts a chain sprocket wheel 26 to provide motion for a worm distributor to be hereinafter described. The chain drive is preferred but gear wheels or any other mechanical devices may be used to effect the same purpose. Suitable bearings 27 carry the shafts 18 and 24. Between the chain driving wheel 19 and the bevel pinion 21, a flexible shaft connection 28 is introduced to permit spring and movement in the overhanging conveyor box. A mixing hopper 29 is carried immediately on the rear of the floor 8 of the vehicle and has its upper edges preferably level therewith. It is removably attached to the conveyor box as by means of iron straps 30 bolted to the mixing hopper and sliding into cleats 31 bolted on the conveyor box 1 so that the mixing hopper may be lifted vertically off and on the conveyor box. The mixing hopper 29 is divided into right hand 32 and left-hand 33 compartments each having sides inclined inwardly. The front face is vertical, and the rear or back face is inclined inwardly so that at its lower end the mixing hopper is the same width from back to front as the conveyor box. The centre division of the hopper 29 is shown particularly in Figure 3 and is seen to comprise sloping sides 34 with a space 35 between them. The sides reach to the hopper floor which provides no outlet for the hopper's contents except through openings 36 and 36a in the centre division so that egress from the hopper is obtained only by way of the openings 36 and 36a and then downwards as the space 35 has no floor. The motion shaft 18 is carried on suitable bearings 37 attached to the hopper sides and passes through the mixing hopper above the floor thereof and through the openings 36 and 36a. Spiral conveyors 38 and 38a are mounted on the shaft 18 in both divisions of the mixing hopper and are so inclined in their helices as to convey material from the hopper inwards to the space 35 between the dividing boards 34, which means that the material from each division 32 and 33 of the hopper is mixed by the influence of the spiral conveyors as the flow of materials meet in the space 35 aforementioned. One spiral conveyor 38 in hopper 32 and the associated opening 36 is made larger than the other conveyor 38a and its associated opening 36a so that from the containing hopper 32 more material is delivered than from the hopper 33 having a smaller spiral. Regulating gates are provided to control the passage of material through the openings 36 and 36a and in their preferred form comprise iron plates 39 made to slide over the spiral conveyors and close the openings 36 and 36a. This construction is shown particularly in Figure 2. The plates lie by their own weight on the sides 34 of the division and are held in the selected vertical position by a wire spring catch 40 which is adapted to enter any of the selected inclined slots 41, in the edge of the regulating gate 39. From the space 35 the mixed materials drop downwards into the conveyor box and are shed to the back 3 and the front 3a compartments by a plate 42 fixed to the top of the mid-board 2 at that place. Plate 42 is shown only in Figure 2.

Figure 1:
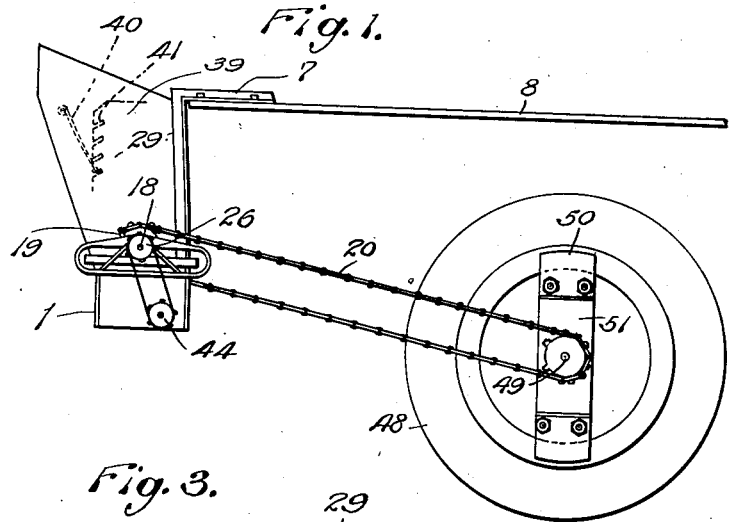
Figure 3:
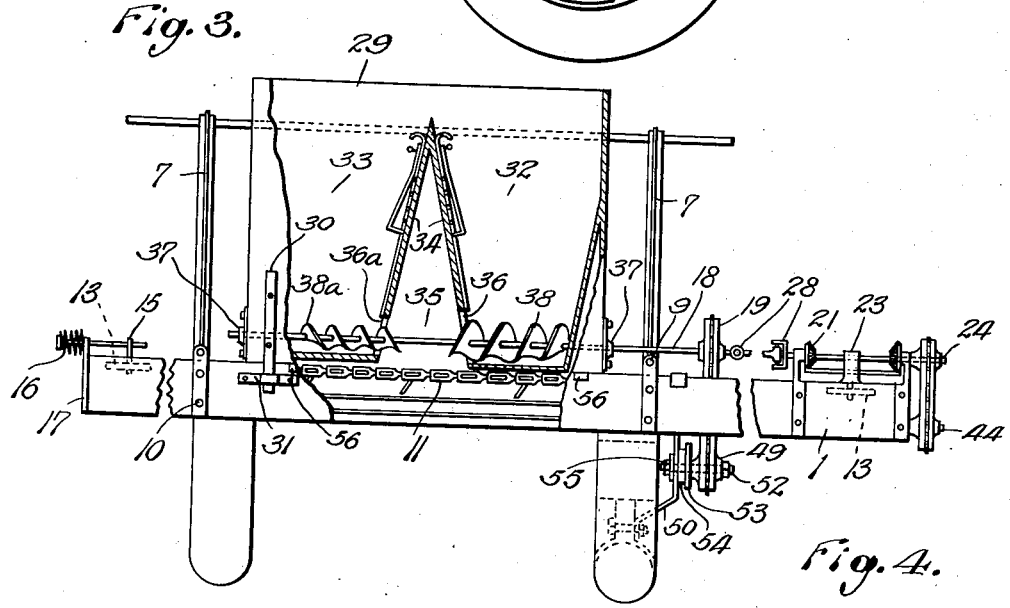
Figure 3 is a rear view of Figure 1.
Figure 4:
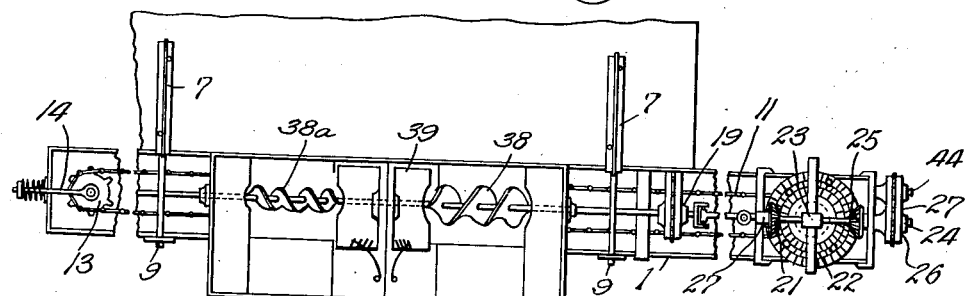
Figure 4 is a plan view of the invention.
Figure 8:
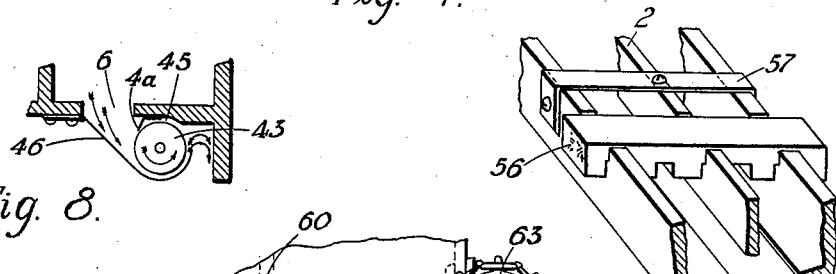
Figure 8 is a diagrammatic illustration to show the worm distributing feature.

The distributing means comprise a rotating worm 43 in the form of a projecting helix wound around a shaft or core 44. The helix may be made in the form of a ribbon of thin sheet metal on edge and welded or otherwise affixed to the shaft. The distributor worm member is mounted on bearings carrying the shaft and is situated beneath a partition 4. In the adaptation shown particularly in Figures 5 and 8, it will be seen that the distributor worm member is placed with the rear edge of the distributor worm immediately under the front of the space 6. The edges of the rotating helix are placed close to the partition board 4 which may be hollowed to accommodate the helix as at 45 Figure 8. A sheet metal tray 46 is provided and hinged to the rear partition 4. The free end of the tray is curved and bent upwards to form a concave gutter or channel approximately coinciding with the diameter of the helix and is retained in position shown in Figures 5 and 8 in close relation to the helix by means of buttons or clips 47 or any suitable attachment provided at intervals. The tray is hingedly attached to a partition so that it might be dropped from near contact with the helix for cleaning purposes. Normally, the tray is close to the helix worm which revolves in a direction suitable to sweep or project the material from the gutter or channel and discharge the said material over the terminal edges of the tray as is shown by arrows in Figure 8. The diameter of the helix relative to the diameter of the core shaft carrying it, and the distance from the helix to the curved end of the tray formed as a channel or gutter are considerations which will determine the amount of the material discharged over the free end of the tray by the revolving helix ribs of the worm. The rotating parts of the hopper and the conveyor box receive motion primarily from the motion shaft 18 above the conveyor box 1. One means of providing power to the shaft 18 is to drive the said shaft off a wheel 48 of the hauling vehicle. This may be effected by gears and shafting attached to the wheel and arranged in any suitable manner. In a preferred form, however chain sprockets are mounted on the vehicle wheel and on the motion shaft 18 and connected by a driving chain. In the drawings accompanying this specification, the driving wheel 19 on the shaft 18 is shown in Figures 1, 3 and 4. The method of attachment of the driving wheel, 49 on the vehicle provides a slipping device through a friction drive so that in the event of any part of the mixing or distributing mechanism becoming jammed, the drive will slip before damage is done. The drive attachment to the vehicle wheel comprises plate 50 secured to the rim of the wheel and having its outer face 51 smoothed. Concentric with the axial centre of the vehicle wheel is a spindle hole through the plate 50. The spindle hole mounts a spindle 52 projecting outwards. A flange 53 on the spindle 52 has a friction disc 54 between it and the outer face 51 of the carrying plate 50. Inside the carrying plate 50 the spindle is secured by a nut or pin 55 having a spring washer under it. On the outer side of the flange 53 the driving wheel 49 is mounted, the spindle being square or carrying a key for this purpose. Varying sizes of driving wheels may be used according to the material being mixed and distributed. The tension of the spring washer and nut 55 draws the flange 53 towards the plate 50 sufficiently to rotate the said spindle and flange in normal circumstances by reason of the friction disc 54 interposed between them. When a jamming of moving parts occurs, the spindle and flange will slip against the face of the friction disc 54. This is one preferred form of friction drive.

Figure 9:
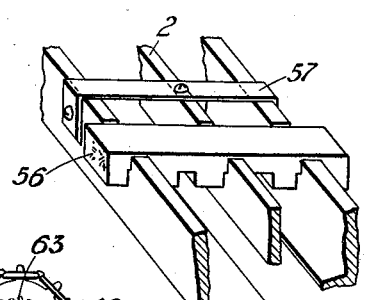
Figure 9 is a diagrammatic illustration to show a gauging board.

To prevent a surplus of material being distributed from the mixing hopper and by the plates on the conveyor chain, a gauging device is provided and shown particularly in Figure 9. In this form it comprises a wooden gauge piece 56 which is notched itself and fits into locating notches in the conveyor box sides 5 and mid-board 2. The gauge piece may be made of varying depths in the compartments 3 and 3a so that only predetermined heights of material above the floor of the compartments will be permitted to pass. Also, in Figure 9 are shown iron stirrups 57. These are bent down at each end and attached to the sides 5 of the conveyor box, and by means of a screw at their center provide suspension for the mid-board 2, as this board has no floor to rest upon, terminating at its lower edge in the space 6.

Figure 10:
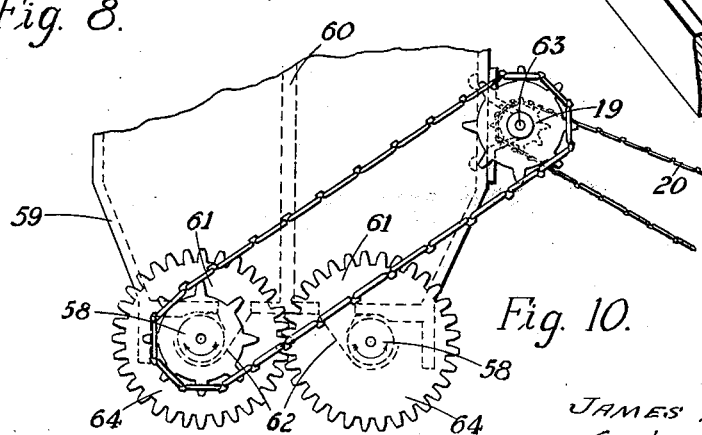
Figure 10 shows an adaptation using two worm distributors.

An adaptation of my invention is shown in Figure 10 wherein the distributing worms 58 are shown under an elongated box 59 divided by a center-board 60, and with discharging spaces 61 at the bottom and hinged sheet metal trays 62 functioning similarly to the tray 46 already herein described. Motion is given to the distributing worms 58 by a chain drive from the motion shaft 63 which may be driven through a toothed disc wheel and bevel (not shown) similar to that employed in the former example, the drive for the said toothed disc wheel being preferably as in the former example by a chain 20 from the vehicle. In the form shown the distributing worms rotate in opposite directions and are geared together by the pinions 64.

The chain and pinion drives shown in Figure 10 are preferred, but any other suitable gear arrangement may be used. In another form of this adaptation, the distributing worms 58 are both placed on the same side of their respective discharging spaces 61, so that they will each revolve in the same direction and rotary movement will be given to each distributing worm shaft separately by a link chain from the shaft 63.

It will be seen from Figure 10 that in these adaptations there need be no conveyor chain or spiral conveyor. In a preferred form this device is secured to the floor of the towing vehicle by similar means to those employed in the former example but there is no hopper. The distributor box 59 may contain say 6 sacks of manure, the manure in operation being emptied in from end to end thereof.

In operation referring to the distributor shown in Figures 1 to 9 the materials to be distributed are emptied into the appropriate divisions in the mixing hopper. The plate gates being set to regulate the proportions delivered from each hopper division. The material being used in the greater quantity is fed through the hopper division having the larger spiral feed screw. From the hopper the mixed parts fall into each side of the conveyor box and the plates on the conveyor chain carry the materials to the right and left of the hopper. The materials fall through the space between the conveyor box horizontal partitions and lie in the channel of the sheet metal tray. There the distributing worm screw sweeps the materials over the open edge of the tray, from whence it falls evenly to the ground. The speed of revolution of the distributing worm screw may be regulated by shifting to a varying mesh the reverse bevel pinion gearing with the toothed disc wheel. Speed of delivery from the hopper relative to distribution is varied by changing the position of the bevel wheel on the motion shaft meshing with the toothed wheel disc.

Although I have described the mixing hopper as utilizable for seeds and manure, it will be readily understood that a different manure may be provided in each partition and the two manures mixed together, or alternatively two different qualities of seeds may be similarly mixed.

I claim:

1. A distributor comprising a container, an endless chain with attached plates for distributing the material in such container and causing same to fall into a receptacle having a substantially unobstructed longitudinal edge of greater length than the width of said container, and a rotatable distributor above such receptacle for ejecting the material substantially evenly over said longitudinal edge to the ground.

2. A distributor comprising a container, an endless chain with attached inclined plates for distributing the material longitudinally in such container and causing same to fall through longitudinally extending slots in the floor of the container into a receptacle having a substantially unobstructed longitudinal edge of greater length than the width of said container, and a rotatable distributor above such receptacle for ejecting the material substantially evenly over said longitudinal edge to the ground.

3. A distributor comprising a hopper having a partition dividing said hopper into separate compartments for containing different types of material to be distributed, means for mixing said different types of material and discharging same into a container, means for distributing the material in such container and causing same to fall into a receptacle having a substantially unobstructed longitudinal edge, and a rotatable distributor above such receptacle for ejecting the material substantially evenly over said longitudinal edge to the ground.

4. A distributor comprising a hopper having a partition dividing said hopper into separate compartments for containing different types of material to be distributed, means for mixing said different types of material and discharging same into a container, an endless chain with attached plates for distributing the materials in such container and causing same to fall into a receptacle having a substantially unobstructed longitudinal edge, and a rotatable distributor above such receptacle for ejecting the material substantially evenly over said longitudinal edge to the ground.

5. A distributor comprising a hopper having a plurality of compartments adapted to contain various types of materials, a common discharge passage from said compartments, a feed screw for discharging material from each of said compartments to said common passage, means for adjusting the quantity of material discharged from each compartment, a container to receive the material from said common passage, means for distributing the material in such container and causing same to fall into a receptacle having a substantially unobstructed longitudinal edge, and a rotatable distributor above such receptacle for ejecting the material substantially evenly over said longitudinal edge to the ground.

6. A distributor comprising a hopper having a plurality of compartments adapted to contain various types of materials, a common discharge passage from said compartments, a feed screw for discharging material from each of said compartments to said common passage, means for adjusting the quantity of material discharged from each compartment, a container to receive the material from said common passage, an endless chain with attached plates for distributing the material in such container and causing same to fall into a receptacle having a substantially unobstructed longitudinal edge, and a rotatable distributor above such receptacle for ejecting the material substantially evenly over said longitudinal edge to the ground.

JAMES MUNRO.